(12) United States Patent
Takahashi et al.

(10) Patent No.: US 6,592,143 B2
(45) Date of Patent: Jul. 15, 2003

(54) PASSENGER PROTECTION DEVICE FOR VEHICLE

(75) Inventors: Masayoshi Takahashi, Himi (JP); Tadashi Sugimoto, Toyama (JP)

(73) Assignee: Aisin Keikinzoku Kabushiki Kaisha, Shinminato (JP)

( * ) Notice: Subject to any disclaimer, the term of this patent is extended or adjusted under 35 U.S.C. 154(b) by 246 days.

(21) Appl. No.: 09/808,010

(22) Filed: Mar. 15, 2001

(65) Prior Publication Data

US 2002/0024201 A1 Feb. 28, 2002

(30) Foreign Application Priority Data

Aug. 24, 2000 (JP) ........................................ 2000-254095

(51) Int. Cl.$^7$ .............................................. B60R 21/22
(52) U.S. Cl. ................. 280/730.2; 280/730.1; 280/748
(58) Field of Search ........................... 280/730.2, 730.1, 280/748, 751; 296/189

(56) References Cited

U.S. PATENT DOCUMENTS

| | | | | |
|---|---|---|---|---|
| 5,163,730 A | * | 11/1992 | Welch | |
| 5,575,500 A | * | 11/1996 | Mimura et al. | |
| 5,836,641 A | * | 11/1998 | Sugamoto et al. | |
| 5,992,924 A | * | 11/1999 | Noritake et al. | |
| 6,079,732 A | * | 6/2000 | Nakajima et al. | |
| 6,257,616 B1 | * | 7/2001 | Nowak et al. | |
| 6,296,269 B1 | * | 10/2001 | Nagai et al. | |
| 6,302,477 B1 | * | 10/2001 | Satou | |

FOREIGN PATENT DOCUMENTS

JP        10-203264 A       8/1998

* cited by examiner

*Primary Examiner*—Paul N. Dickson
*Assistant Examiner*—Tony Winner
(74) *Attorney, Agent, or Firm*—Burns, Doane, Swecker & Mathis, LLP

(57) ABSTRACT

A front pillar of a vehicle includes an inner panel and a garnish panel that covers the inner panel. An air bag is located between the inner panel and the garnish panel. A shock absorber is located adjacent to the air bag and is located between the inner panel and the garnish panel. The shock absorber is fixed to the pillar frame and is separated from the garnish panel. When a primary collision of the vehicle occurs, a secondary collision between a passenger and the front pillar is prevented by the air bag. Even if the passenger directly hits the front pillar, the shock absorber reduces shock accompanying the secondary collision.

11 Claims, 3 Drawing Sheets

PASSENGER PROTECTION DEVICE FOR VEHICLE

BACKGROUND OF THE INVENTION

The present invention relates to a device for protecting passengers of a vehicle when the vehicle collides with something. Particularly, the present invention pertains to a device for preventing a secondary collision of a passenger against the structure of a vehicle or to a device for reducing the shock that accompanies a secondary collision. The device is particularly suitable for front pillars and roof side rails of vehicles.

Several measures have been devised for protecting passengers of a vehicle when a vehicle collides with something, or when a primary collision occurs. One of the measures is to absorb shock due to a primary collision by the vehicle. Another measure is to reduce shock due to a secondary collision. In a secondary collision, which occurs subsequent to a primary collision, a passenger hits a structure of a vehicle due to a reaction of a primary collision.

FIG. 6 illustrates a passenger protection device disclosed in Japanese Unexamined Patent Publication No. 10-203264. The device is installed in a vehicle front pillar and includes an inner panel 130 and a pillar garnish panel 140. The pillar garnish panel 140 faces the inner panel 130. A resin shock absorber 190 is accommodated in a space S defined between the inner panel 130 and a pillar garnish panel 140. The shock absorber 190 has a lattice structure and is coupled to the pillar garnish panel 140. When a passenger collides with the pillar garnish panel 140, the shock absorber 190 absorbs the shock.

However, the pillar garnish panel 140 and the shock absorber 190 may be disengaged from the inner panel 130 due to the reaction of a primary collision of the vehicle. In such a case, shock due to a secondary collision between a passenger and the inner panel 130 is not reduced.

A passenger protection device shown in FIG. 5 includes an air bag 180. The air bag 180 is accommodated in a space S, which is defined between an inner panel 130 and a pillar garnish panel 140. When a primary collision occurs, the air bag 180 inflates toward a passenger while deforming a part of the pillar garnish panel 140. The air bag 180 receives the passenger and prevents a secondary collision between the passenger and the front pillar.

However, depending on the condition of a primary collision, the air bag 180 may not inflate. In this case, the passenger will collide with the front pillar. Even if the air bag 180 inflates, the timing is not appropriate for receiving a passenger. If the inflation of the air bag 180 is too late, a passenger may collide with the center pillar before the air bag 180 inflates. After inflating, the air bag 180 starts deflating. Therefore, if the inflation occurs too early, a passenger may hit the deflating air bag 180. In this case, the air bag 180 may not sufficiently absorb the shock and the passenger may collide with the front pillar.

SUMMARY OF THE INVENTION

Accordingly, it is an objective of the present invention to provide a passenger protection device that reliably protects passengers of a vehicle from shock due to a collision of the vehicle.

To achieve the foregoing and other objectives and in accordance with the purpose of the present invention, a passenger protection device of a vehicle is provided. The vehicle includes a body frame and a garnish that covers the body frame. The device includes an air bag and a shock absorber. The air bag is located between the body frame and the garnish. When the vehicle collides with something, the air bag inflates into the passenger compartment to receive a passenger. The shock absorber is located between the body frame and the garnish. The shock absorber is fixed to the body frame and is separated from the garnish. The shock absorber absorbs shock applied to the shock absorber.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
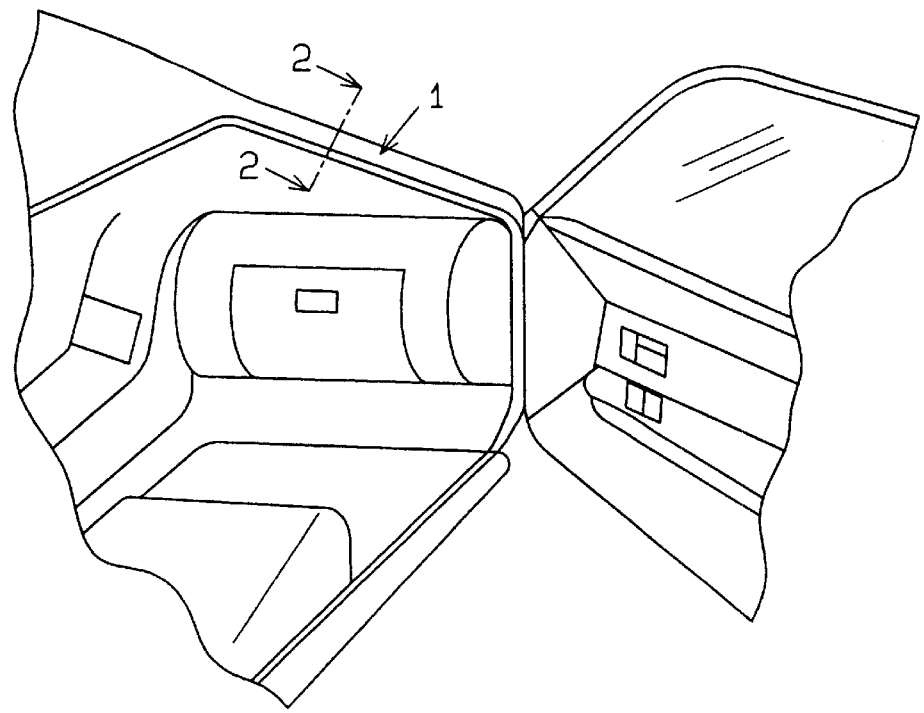
FIG. 1 is a perspective view illustrating a front pillar of a vehicle according to a first embodiment of the present invention.
Figure 2:
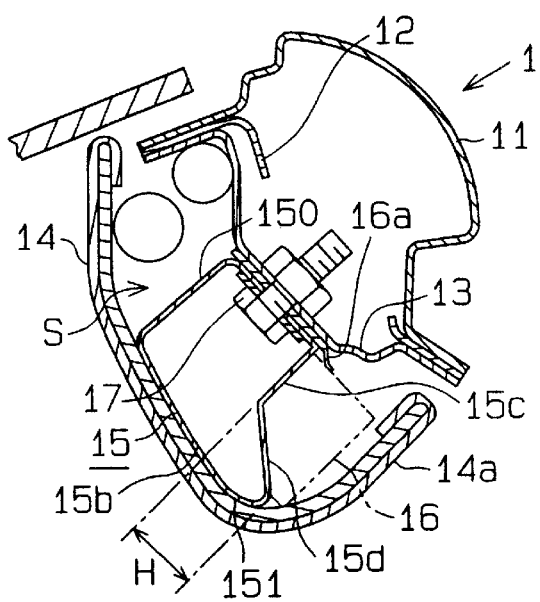
FIG. 2 is a cross-sectional view taken along line 2—2 of FIG. 1.

A first embodiment of the present invention will now be described with reference to FIGS. 1 to 3. FIG. 1 is a perspective view illustrating a vehicle when the right front door is open. As shown in FIGS. 1 and 2, a right front pillar 1 of the vehicle includes an outer panel 11 and first and second inner panels 12, 13, which are fixed to the outer panel 11. The panels 11–13 form a pillar frame that is part of the vehicle frame. The front pillar 1 also includes a garnish panel 14, a hollow shock absorber 15 and an air bag 16. The garnish panel 14 covers the second inner panel 13 from the interior of the passenger compartment. Although not shown in the drawings, the left front pillar of the vehicle has the same structure as the right front pillar 1.

A space S is defined between the second inner panel 13 and the garnish panel 14. The air bag 16 extends along the longitudinal direction of the front pillar 1 in the space S. The air bag 16 is closer to the corresponding door. The air bag 16 is supported by a stay 16a, which is fastened to the second inner panel 13 by bolts 17.

The shock absorber 15 extends along the longitudinal direction of the front pillar 1 in the space S and is located adjacent to the air bag 16. The shock absorber 15 is made of, for example, aluminum, and is formed by extrusion molding. The shock absorber 15 is fastened to the second inner panel 13 by the bolts 17 together with the air bag 16. The shock absorber 15 is formed separately from the garnish panel 14 and is not coupled to the garnish panel 14.

The shock absorber 15 has a main body 150 and a projection 151. The main body 150 has a substantially square cross section. The projection 151 has a substantially V-shaped cross section and is located between the air bag 16 and the garnish panel 14. Specifically, the shock absorber 15 has a front wall 15b, which faces the inner face of the garnish panel 14, a side wall 15c, which faces the air bag 16, and a slant wall 15d, which faces the air bag 16 and is inclined relative to the side wall 15c. A portion the front wall 15b that is close to the door extends between the air bag 16 and the garnish panel 14. The slant wall 15d couples the edge of the front wall 15b that is close to the door to the side wall 15c. The edge and the slant wall 15d form the projection 151.

The projection 151, which has a substantially V-shaped cross section, is more rigid than the main body 150. The shock absorber 15 may be formed such that the projection 151 is thicker than the main body 150. This will further increase the rigidity of the projection 151.

The projection 151 is designed such that the shock absorber 15 effectively absorbs shock due to a collision with a passenger but does not hinder the inflation of the air bag 16. Specifically, the projecting amount H of the projection 151 from the side wall 15c, or the overlapping amount H of the projection 151 relative to the air bag 16, is in a range between five to twenty millimeters. The shape of the projection 151 such as the angle of the slant wall 15d relative to the side wall 15c may be changed as long as the overlapping amount H is within the range.

When the vehicle collides with something, or when a primary collision occurs, the collision is detected by a sensor (not shown) that is stalled in the vehicle. The sensor is, for example, an acceleration sensor. When the deceleration of the vehicle, which is detected by the sensor, reaches a predetermined level, a primary collision is judged to have occurred. At this time, the air bag 16 inflates toward a passenger while deforming an edge 14a of the garnish panel 14, which is close to the door. The air bag 16 receives the passenger and prevents a secondary collision between the passenger and the front pillar 1.

The direction in which the air bag 16 inflates can be adjusted such that the air bag 16 absorbs shock in an optimum manner. Specifically, the inflation direction may be adjusted by changing the angle of the slant wall 15d relative to the side wall 15c by changing the shape of the projection 151.

When a primary collision occurs, the air bag 16 does not inflate unless the deceleration of the vehicle, which is detected by the acceleration sensor, reaches the predetermined level. As explained in the prior art section, depending on the condition of the primary collision, the passenger is flung toward the front pillar 1 at different timing than the air bag 16 inflates. In this case, the passenger collides with the front pillar 1 because the air bag 16 does not inflate at all or inflates too late. Further, the passenger may hit the air bag 16 when it is deflating. In this case, the air bag 16 cannot sufficiently absorb shock, and the passenger hits the front pillar 1.

Figure 3:
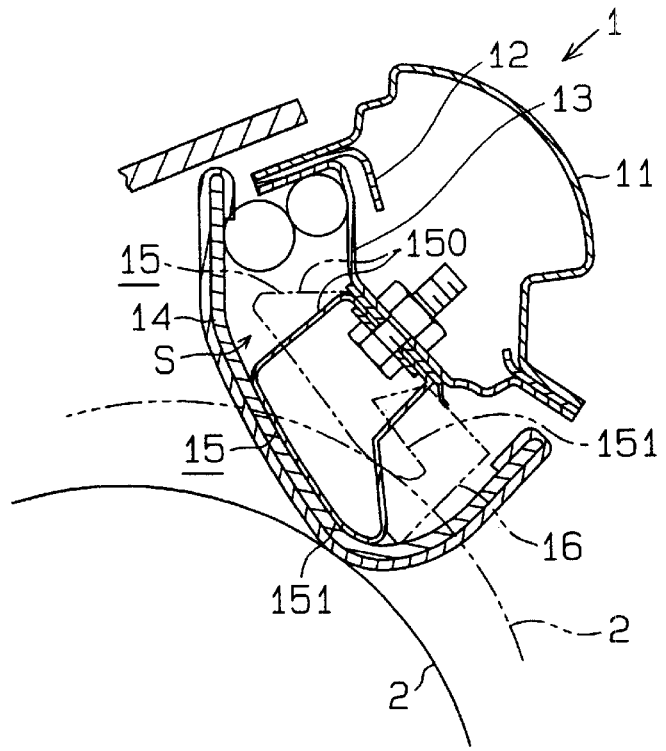
FIG. 3 is a cross-sectional view like FIG. 2 when the head of a passenger collides with the front pillar.

FIG. 3 shows a case when the head 2 of a passenger collides with the garnish panel 14. The shock of the collision is transmitted to the projection 151 of the shock absorber 15. Due to the reaction of the primary collision of the vehicle or due to the inflation of the air bag 16, the garnish panel 14 may fall off the front pillar 1. In this case, the head 2 of the passenger directly collides with the projection 151. The rigidity of the projection 151 is higher than that of the remainder of the shock absorber 15. Thus, the energy applied to the projection 151 is transmitted to the entire shock absorber 15 without deforming the projection 151. Specifically, the shock absorber 15 is deformed as illustrated by two-dashed line in FIG. 3. Accordingly, the energy of the collision is absorbed by the shock absorber 15, which reduces the shock accompanying the secondary collision.

As described above, when a primary collision occurs, the air bag 16 prevents a secondary collision between the passenger and the front pillar 1 from occurring. Also, even if the passenger directly hits the front pillar 1, the shock absorber 15, which is accommodated in the front pillar 1, reduces the shock accompanying the secondary collision.

The shock absorber 15 is not coupled to the garnish panel 14 and is fastened to the second inner panel 13 by the bolts 17. Thus, even if the garnish panel 14 falls off the front pillar 1, the shock absorber 15 keeps being attached to the front pillar 1. Therefore, shock accompanying a secondary collision of the passenger is reliably reduced by the shock absorber 15.

Figure 4:
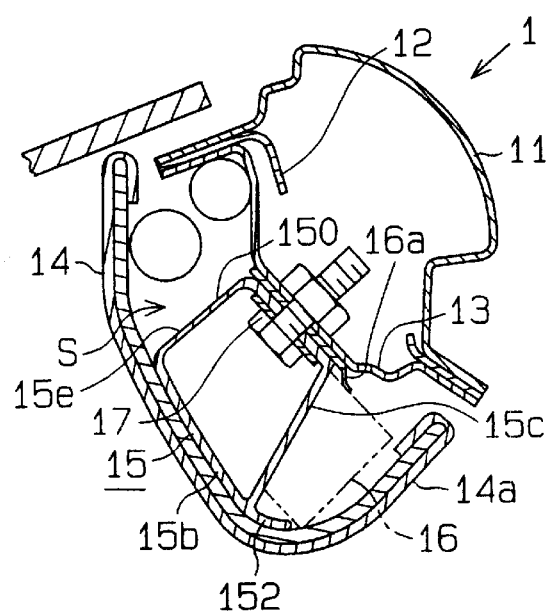
FIG. 4 is a cross-sectional view illustrating a front pillar according to a second embodiment.
Figure 5:
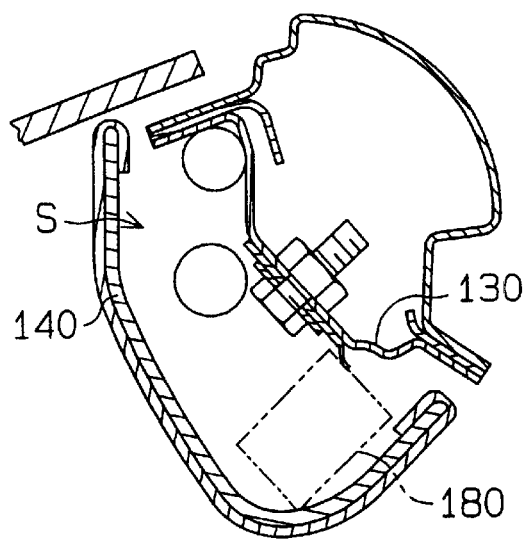
FIG. 5 is a cross-sectional view illustrating a prior art front pillar.
Figure 6:
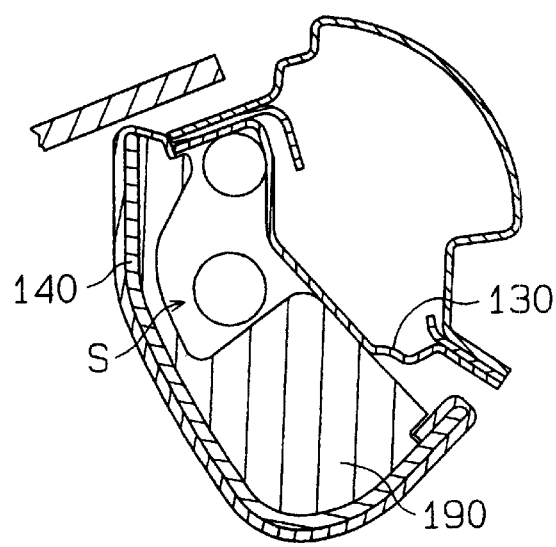
FIG. 6 is a cross-sectional view illustrating another prior art front pillar.

A second embodiment of the present invention will now be described with reference to FIG. 4. Mainly, the differences from the embodiment of FIGS. 1 to 3 will be discussed below. As shown in FIG. 4, the shape of the shock absorber 15 is different from that in the embodiment of FIGS. 1 to 3. Specifically, the cross section of the main body 150 of the shock absorber 15 is substantially trapezoidal. The shock absorber 15 of FIG. 4 also has a projection plate 152 extending from the main body 150. The projection plate 152 is formed by the edge of the front wall 15b. The shock absorber 15 of FIG. 4 does not have the slant wall 15d, which is shown in FIG. 2. The inclined side wall 15c that faces the air bag 16 is directly coupled to the proximal end of the projection plate 152. The front wall 15b is thicker than the side walls 15c, 15e so that front wall 15b, which includes the projection plate 152, is more rigid than the side walls 15c, 15e of the main body 150. The side wall 15c is thicker than the side wall 15e.

The shock absorber 15 of FIG. 4 operates in the same manner as the shock absorber 15 of FIGS. 1 to 3 operates. Particularly, since the shock absorber 15 has the projection plate 152, the space for the air bag 16 is enlarged. This facilitates the installation of the air bag 16 into the space S. In other words, a relatively large air bag 16, which has a better shock absorbing characteristics, can be used.

It should be apparent to those skilled in the art that the present invention may be embodied in many other specific forms without departing from the spirit or scope of the invention. Particularly, it should be understood that the invention may be embodied in the following forms.

In the illustrated embodiment, the projection 151 or the projection plate 152 is located between the air bag 16 and the garnish panel 14 to receive a passenger. However, at least part of the shock absorber 15 may be located between the air bag 16 and the second inner panel 13. This structure operates in the same manner as the illustrated embodiments and has the same advantages.

The shock absorber 15 may be fastened to the second inner panel 13 by a fastener other than the bolts 17. Alternatively, the shock absorber 15 may be glued to the second inner panel 13 with adhesive.

In the illustrated embodiments, the present invention is applied to the front pillar 1. However, the present invention may be applied to other parts of a vehicle such as a roof side rail.

Therefore, the present examples and embodiments are to be considered as illustrative and not restrictive and the invention is not to be limited to the details given herein, but may be modified within the scope and equivalence of the appended claims.

What is claimed is:

1. A passenger protection device of a vehicle, wherein the vehicle includes a body frame and a garnish that covers the body frame, the device comprising:

an air bag located between the body frame and the garnish, wherein, when the vehicle collides with something, the air bag inflates into a passenger compartment to receive a passenger; and a shock absorber located between the body frame and the garnish, wherein the shock absorber is fixed to the body frame and is not coupled to the garnish, and wherein the shock absorber absorbs shock applied to the shock absorber, the shock absorber including a portion located between the air bag and the garnish which has a rigidity higher than the rigidity of the remainder of the shock absorber.

2. A passenger protection device of a vehicle, wherein the vehicle includes a body frame and a garnish that covers the body frame, the device comprising:

an air bag located between the body frame and the garnish, wherein, when the vehicle collides with something, the air bag inflates into the passenger compartment to receive a passenger; and a shock absorber located between the body frame and the garnish, wherein the shock absorber is fixed to the body frame and is not coupled to the garnish, and wherein the shock absorber absorbs shock applied to the shock absorber, wherein the shock absorber has a main body, which is formed like a hollow tube, and a projection, which protrudes from the main body, and wherein the projection is located between the air bag and the garnish.

3. The device according to claim 2, wherein the rigidity of the projection is higher than the rigidity of the main body.

4. The device according to claim 2, wherein the projection has a substantially V-shaped cross section.

5. The device according to claim 2, wherein the projection is formed like a plate.

6. The device according to claim 2, wherein the projection overlaps the air bag by five to twenty millimeters.

7. A passenger protection device installed in a front pillar of a vehicle, wherein the front pillar includes a pillar frame and a garnish panel that covers the pillar frame, the device comprising:

an air bag located between the pillar frame and the garnish panel, wherein the air bag is supported by the pillar frame, wherein, when the vehicle collides with something, the air bag inflates into the passenger compartment to receive a passenger; and a shock absorber that is located between the pillar frame and the garnish panel and is located adjacent to the air bag, wherein the shock absorber is fixed to the pillar frame and is not coupled to the garnish panel, wherein the shock absorber includes a main body, which is formed like a hollow tube, and a projection, which protrudes from the main body, wherein the projection is located between the air bag and the garnish panel, and wherein, when receiving shock, the shock absorber is deformed to absorb the shock.

8. The device according to claim 7, wherein the rigidity of the projection is higher than the rigidity of the main body.

9. The device according to claim 7, wherein the projection has a substantially V-shaped cross section.

10. The device according to claim 7, wherein the projection is formed like a plate.

11. The device according to claim 7, wherein the projection overlaps the air bag by five to twenty millimeters.

* * * * *